UNITED STATES PATENT OFFICE.

WILHELM HAHNENKAMM, OF SINDLINGEN, NEAR HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

ARYLATED NAPHTHYLAMIN SULFONIC ACIDS AND PROCESS OF MAKING SAME.

1,125,311.      Specification of Letters Patent.      Patented Jan. 19, 1915.

No Drawing.      Application filed March 7, 1912. Serial No. 682,282.

*To all whom it may concern:*

Be it known that I, WILHELM HAHNENKAMM, Ph. D., chemist, a citizen of the Empire of Germany, residing at Sindlingen, near Höchst-on-the-Main, Germany, have invented certain new and useful Improvements in Arylated Naphthylamin Sulfonic Acids and Processes of Making Same, of which the following is a specification.

I have found that the para-diamins (under which term are to be comprised not only the mononuclear diamins such as paraphenylenediamin, but also the heteronuclear diamins, such as benzidin, etc.,) for instance p - phenylenediamin, paratoluylenediamin and their substitution products, naphthylenediamin, benzidin and its substitution products, can be combined with naphthylamin sulfonic acids, such, for instance as 1.7, (or 1.8- or 1.2) naphthylamin sulfonic acid, naphthylamindisulfonic acid, such as 1.4-8-naphthylamindisulfonic acid, or the like to form new arylated naphthylamin sulfonic acids, or in other words naphthylated para-diamins. The new acids thus obtained are valuable parent products for manufacturing azo-, sulfur-, and other dyestuffs. They have the general formula:

$$NH_2.Ar.NH.Ns$$

wherein the group $NH_2.Ar.NH$ stands for the residue of a p-diamin and "Ns" for the residue of a naphthylamin sulfonic acid; are soluble in diluted alkalis, and yield, when oxidized together with a p-aminophenol, indophenols which give by sulfuration with alkali-polysulfid in presence of copper, valuable green sulfur dyestuffs of extremely great fastness.

The condensation is advantageously effected by fusing at a suitable temperature the components with or without the addition of an indifferent solvent or suspending or condensing agent (these agents to be comprised under the term "diluents.")

The following examples serve to illustrate my invention, but are not intended to limit the same:

Example I: 44.6 kg. of 1-naphthylamin-8-sulfonic acid are mixed with 55.2 kg. of benzidin and this mixture is heated in a suitable apparatus to about 200° C. for 10 hours. The melt thus obtained is dissolved in 2000 liters of water and 10.6 kg. of sodium carbonate and acidified, at boiling heat, with hydrochloric acid until a test with Congo-red shows a slightly acid reaction, whereupon the condensation product of 1-naphthylamin-8-sulfonic acid and benzidin separates as a green insoluble body. For purifying the body, it is re-dissolved in sodium carbonate and precipitated with hydrochloric acid, at boiling heat, or it is transformed into its calcium salt. By the latter method it is possible to dissociate the condensation product into two different components which are both suitable for the manufacture of dyestuffs. If the 1.2-naphthylaminsulfonic acid be substituted for the 1.7 (or 1.8) naphthylaminsulfonic acid, an analogous product is obtained which can be easily separated from the benzidin by means of hydrochloric acid and isolated with caustic soda lye or common salt so as to obtain the sodium salt. It readily dissolves in water and reprecipitates in caustic soda lye. When using naphthylamindisulfonic acids, the procedure is the same; thus there is obtained, for instance from the 1.4.8-naphthylamindisulfonic acid and benzidin, a sulfonic acid of a greenish coloration.

Example II: A paste, prepared from 19.9 kg. of p-p-diaminodiphenylamin, is intimately mixed with 22.3 kg. of 1-naphthylamin-8-sulfonic acid and 30 kg. of glycerin, and this mixture is heated for 10 hours to 150° C. There are then added while stirring for one hour, 350 kg. of hydrochloric acid 1:10 at 70-80°, the mass is filtered off and after removing the excess of p-p-diaminodiphenylamin by washing with boiling hydrochloric acid 1:10, it is washed with water until there is no further acid reaction to Congo-red, whereupon the finely distributed product is separated by boiling with a solution of sodium carbonate. The condensation product is precipitated from the boiling solution of sodium carbonate by boiling hydrochloric acid 1:50. For further purifying the product, the procedure may be as indicated in example I.

Example III: A paste, prepared from 10.8 kg. of p-phenylenediamin, is intimately mixed with 22.3 kg. of 1-naphthylamin-8-sulfonic acid and 30 kg. of glycerin, and this mixture is heated for ten hours to 150° C. There are then added while stirring for one hour, 350 kg. of hydrochloric acid 1:10 at 70-80°, the mass is filtered off and after removing the excess of p-phenylenediamin by washing with boiling hydrochloric acid 1:10, it is washed with water until there is no further acid reaction to Congo-red, whereupon the finely-distributed product is separated by boiling with a solution of sodium carbonate. The condensation product is precipitated from the boiling solution of sodium carbonate by boiling hydrochloric acid 1:50. In this way a naphthylated sulfonic acid is obtained which is almost insoluble in diluted hydrochloric acid and also in hot water and can be separated thereby from the p-phenylenediamin and the 1:8 naphthylamin sulfonic acid. It has the general formula:—

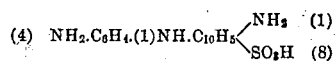

is soluble in diluted alkalis, and yields, when oxidized together with p-amino-phenol, an indophenol which gives by sulfuration with alkalipolysulfid in presence of copper, valuable green sulfur dyestuffs of extremely great fastness. Similar naphthylated sulfonic acids are also produced by means of other diamins such as p-toluylenediamins. Besides water, there may be used the other usual diluents such, for instance, as glycerin, paraffin or the like.

Having now described my invention, what I claim, is:

1. The process of manufacturing new arylated naphthylamin sulfonic acids, which consists in condensing a para-diamin with a naphthylamin sulfonic acid.

2. The process of manufacturing new arylated naphthylamin sulfonic acids, which consists in condensing a para-diamin with a naphthylamin sulfonic acid in presence of a diluent.

3. As new articles of manufacture, the products obtained by condensing a para-diamin with a naphthylamin sulfonic acid, having the general formula:

NH$_2$Ar.NH.Ns wherein the group NH$_2$.Ar.NH stands for the residue of a p-diamin and "Ns" for the residue of a naphthylamin sulfonic acid; said products being soluble in diluted alkalis, yielding, when oxidized together with a p-aminophenol, indophenols which give by sulfuration with alkali-polysulfids in presence of copper, valuable green sulfur dyestuffs of extremely great fastness.

4. As a new article of manufacture, the product of the condensation of 1.8-naphthylamin sulfonic acid with p-phenylenediamin, being soluble in diluted alkalis and having the general formula:

and yielding, when oxidized together with p-amino-phenol, an indophenol which gives by sulfuration with alkalipolysulfid in presence of copper, valuable green sulfur dyestuffs of extremely great fastness.

In testimony whereof, I affix my signature in presence of two witnesses.

DR. WILHELM HAHNENKAMM.

Witnesses:
  JEAN GRUND,
  CARL GRUND.